(12) United States Patent
Seo et al.

(10) Patent No.: US 12,527,360 B2
(45) Date of Patent: Jan. 20, 2026

(54) AEROSOL GENERATION DEVICE HAVING VIBRATION PART AND CONTROL METHOD THEREOF

(71) Applicant: KT&G CORPORATION, Daejeon (KR)

(72) Inventors: Jang Won Seo, Daejeon (KR); Gyoung Min Go, Daejeon (KR); Hyung Jin Bae, Daejeon (KR); Chul Ho Jang, Daejeon (KR); Min Seok Jeong, Daejeon (KR); Jong Seong Jeong, Daejeon (KR); Jin Chul Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 365 days.

(21) Appl. No.: 18/027,198

(22) PCT Filed: Apr. 21, 2022

(86) PCT No.: PCT/KR2022/005750
§ 371 (c)(1),
(2) Date: Mar. 20, 2023

(87) PCT Pub. No.: WO2022/260270
PCT Pub. Date: Dec. 15, 2022

(65) Prior Publication Data
US 2023/0371614 A1  Nov. 23, 2023

(30) Foreign Application Priority Data

Jun. 11, 2021 (KR) .......................... 10-2021-0075806

(51) Int. Cl.
*A24F 40/85* (2020.01)
*A24F 40/20* (2020.01)
(Continued)

(52) U.S. Cl.
CPC .............. *A24F 40/85* (2020.01); *A24F 40/20* (2020.01); *A24F 40/465* (2020.01); *A24F 40/53* (2020.01)

(58) Field of Classification Search
None
See application file for complete search history.

(56) References Cited

U.S. PATENT DOCUMENTS

2004/0149737 A1   8/2004  Sharpe et al.
2017/0119059 A1*  5/2017  Zuber .................... A24F 40/05
(Continued)

FOREIGN PATENT DOCUMENTS

CN    109222246 A    1/2019
CN    111728282 A    10/2020
(Continued)

OTHER PUBLICATIONS

Translation of CN 213307430 (Year: 2021).*
(Continued)

*Primary Examiner* — Cynthia Szewczyk
(74) *Attorney, Agent, or Firm* — Sughrue Mion, PLLC

(57) ABSTRACT

An aerosol generation device having a vibration part and a control method thereof are provided. The aerosol generation device according to some embodiments of the present disclosure may include a housing including an accommodation space for accommodating an aerosol-generating article, a heating element configured to be inserted into the aerosol-generating article accommodated in the accommodation space and heat the accommodated aerosol-generating article to generate an aerosol, and a vibration part. The vibration part may vibrate the heating element to prevent formation of stuck-on residue on the heating element and allow removal of stuck-on residue formed on the heating element.

10 Claims, 6 Drawing Sheets

Figure 1:
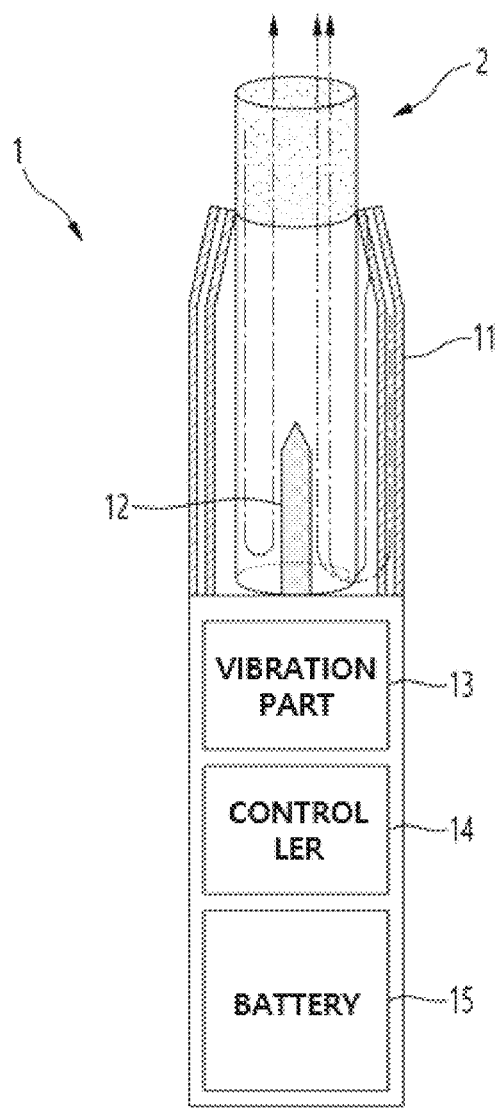

(51) Int. Cl.
　　　*A24F 40/465*　　　(2020.01)
　　　*A24F 40/53*　　　(2020.01)

(56) References Cited

U.S. PATENT DOCUMENTS

2020/0205478 A1* 7/2020 Dick .................. A24F 40/65
2021/0368864 A1　12/2021 Ding et al.

FOREIGN PATENT DOCUMENTS

| | | |
|---|---|---|
| CN | 112188837 A | 1/2021 |
| CN | 212590258 U | 2/2021 |
| CN | 213307430 U | 6/2021 |
| EP | 3 804 541 A2 | 4/2021 |
| WO | 2019/030000 A1 | 2/2019 |
| WO | WO-2019238812 A1 * 12/2019 ............. A24F 40/40 |

OTHER PUBLICATIONS

Extended European Search Report issued Feb. 19, 2024 in European Application No. 22820399.8.
International Search Report for PCT/KR2022/005750 dated Aug. 4, 2022 (PCT/ISA/210).

* cited by examiner

AEROSOL GENERATION DEVICE HAVING VIBRATION PART AND CONTROL METHOD THEREOF

CROSS REFERENCE TO RELATED APPLICATIONS

This application is a National Stage of International Application No. PCT/KR2022/005750 filed Apr. 21, 2022, claiming priority based on Korean Patent Application No. 10-2021-0075806 filed Jun. 11, 2021.

TECHNICAL FIELD

The present disclosure relates to an aerosol generation device having a vibration part and a control method thereof, and more particularly, to an aerosol generation device having a vibration part configured to vibrate a heating element, thus being capable of preventing a formation of stuck-on residue on the heating element and removing stuck-on residue, and a control method of the device.

BACKGROUND ART

In recent years, demand for alternative methods that overcome the disadvantages of general cigarettes has increased. For example, demand for heating-type aerosol generation devices that electrically heat a cigarette to generate an aerosol has increased. Accordingly, active research has been carried out on heating-type aerosol generation devices, and recently, an aerosol generation device that heats a cigarette using a heating element inserted into the cigarette has been proposed.

Meanwhile, Korean Patent Registration No. 10-1667124 relates to a device heating a cigarette to generate an aerosol and deals with a structure of a holder that assists in an operation of inserting or separating a cigarette into or from the aerosol generation device.

When using the aerosol generation device having such a structure, the user performs an operation of inserting a cigarette into the holder extracted to the outside of the aerosol generation device and pushing the holder and the cigarette into the aerosol generation device before smoking, and performs a task of causing the holder to protrude out of the aerosol generation device and removing the cigarette from the holder after smoking.

However, the holder simply serves to guide the insertion and removal of the cigarette and thus cannot prevent residues generated from the cigarette during smoking from remaining in an inner space of the aerosol generation device or on components thereof such as a heating element.

For example, the user removes the cigarette inserted into the holder by holding the cigarette in his or her hand and pulling the cigarette out of the holder, and due to a high fixing strength, stuck-on residue (e.g., a tobacco component) formed on a contact surface between the cigarette and the heating element mostly remains on the heating element without being detached even after the cigarette is removed. Therefore, the cleanliness of the aerosol generation device is gradually lowered with the use of the device. Further, the stuck-on residue formed on the heating element is condensed by heat and more firmly fixed with the use of the device and thus may cause a burnt taste during smoking.

DISCLOSURE

Technical Problem

Some embodiments of the present disclosure are directed to providing an aerosol generation device capable of preventing a formation of stuck-on residue on a heating element, thus improving the cleanliness of the device.

Some embodiments of the present disclosure are also directed to providing an aerosol generation device having a function of removing stuck-on residue formed on a heating element, thus improving the cleanliness of the device.

Some embodiments of the present disclosure are also directed to providing an aerosol generation device capable of improving an ease of insertion/removal of a heating element into/from an aerosol-generating article.

Some embodiments of the present disclosure are also directed to providing an aerosol generation device capable of improving a smoking quality of an aerosol-generating article.

Objectives of the present disclosure are not limited to the above-mentioned objectives, and other unmentioned objectives should be clearly understood by those of ordinary skill in the art to which the present disclosure pertains from the description below.

Technical Solution

Some embodiments of the present disclosure provide an aerosol generation device including a housing including an accommodation space for accommodating an aerosol-generating article, a heating element configured to be inserted into the aerosol-generating article accommodated in the accommodation space and heat the accommodated aerosol-generating article to generate an aerosol, a vibration part configured to vibrate the heating element, and a controller configured to control the vibration part.

In some embodiments, the vibration part may vibrate the heating element in a vertical direction of the accommodated aerosol-generating article.

In some embodiments, the controller may operate the vibration part while the heating element is being inserted into the aerosol-generating article.

In some embodiments, the controller may operate the vibration part at a time point at which smoking ends or while the accommodated aerosol-generating article is being removed.

In some embodiments, the controller may control an operation of the vibration part on the basis of a predetermined time condition.

In some embodiments, the controller may operate the vibration part in response to determination that a temperature of the heating element is a reference value or higher.

In some embodiments, the controller may operate the vibration part in response to a detection of a user's puff.

Some embodiments of the present disclosure provide a control method of an aerosol generation device having a heating element inserted into an aerosol-generating article and a vibration part configured to vibrate the heating element, the control method including determining whether a predetermined condition is satisfied and operating the vibration part in response to determination that the predetermined condition is satisfied.

Some embodiments of the present disclosure provide a computer program that is associated with hardware and stored in computer-readable recording media to execute determining whether a predetermined condition is satisfied and, in response to a determination that the predetermined condition is satisfied, using a vibration part to vibrate a heating element inserted into an aerosol-generating article.

Advantageous Effects

According to some embodiments of the present disclosure, an aerosol generation device having a vibration part can be provided. The provided aerosol generation device can vibrate a heating element using the vibration part to prevent formation of stuck-on residue on the heating element or remove formed stuck-on residue. For example, when the heating element is vibrated during smoking, a fine gap is formed between the heating element and an aerosol-forming substrate, and thus the aerosol-forming substrate can be prevented from being fixed onto a surface of the heating element, and a local carbonization phenomenon of the aerosol-forming substrate can also be prevented. Accordingly, the cleanliness of the aerosol generation device can be improved, and since a problem that stuck-on residue causes a burnt taste is also significantly mitigated, the overall smoking quality can also be improved.

Also, by vibrating the heating element using the vibration part while the heating element is being inserted into an aerosol-generating article, the ease of insertion of the heating element can be improved (that is, the heating element can be easily inserted into the aerosol-generating article). Likewise, by vibrating the heating element using the vibration part while the heating element is being removed from inside the aerosol-generating article, the ease of removal of the heating element can also be improved.

In addition, the vibration part can be operated on the basis of a time condition, a temperature condition, and/or a puff condition. Accordingly, operational efficiency of the vibration part can be improved. For example, by operating the vibration part at a time point at which the probability of formation of stuck-on residue is high on the basis of any of the above conditions, power consumption of the vibration part can be reduced, and simultaneously, formation of stuck-on residue can also be effectively prevented.

The advantageous effects according to the technical spirit of the present disclosure are not limited to those mentioned above, and other unmentioned advantageous effects should be clearly understood by those of ordinary skill in the art from the description below.

DESCRIPTION OF DRAWINGS

FIG. 1 is an exemplary view schematically illustrating an aerosol generation device according to some embodiments of the present disclosure.

FIG. 2 is an exemplary view for describing an operation of a vibration part according to some embodiments of the present disclosure.

FIG. 3 is an exemplary view for describing structures of the vibration part and a heating element according to some embodiments of the present disclosure.

FIG. 4 is an exemplary flowchart illustrating a control method of an aerosol generation device according to some embodiments of the present disclosure.

FIG. 5 is an exemplary flowchart illustrating a method of controlling a vibration part according to some embodiments of the present disclosure.

FIG. 6 is an exemplary flowchart illustrating a method of controlling a vibration part according to some other embodiments of the present disclosure.

MODES OF THE INVENTION

Hereinafter, exemplary embodiments of the present disclosure will be described in detail with reference to the accompanying drawings. Advantages and features of the present disclosure and methods of achieving the same should become clear from embodiments described in detail below with reference to the accompanying drawings. However, the technical spirit of the present disclosure is not limited to the following embodiments and may be implemented in various different forms. The following embodiments only make the technical spirit of the present disclosure complete and are provided to completely inform those of ordinary skill in the art to which the present disclosure pertains of the scope of the disclosure. The technical spirit of the present disclosure is defined only by the scope of the claims.

In assigning reference numerals to components of each drawing, it should be noted that the same reference numerals are assigned to the same components where possible even when the components are illustrated in different drawings. Also, in describing the present disclosure, when detailed description of a known related configuration or function is deemed as having the possibility of obscuring the gist of the present disclosure, the detailed description thereof will be omitted.

Unless otherwise defined, all terms including technical or scientific terms used in the following embodiments have the same meaning as commonly understood by those of ordinary skill in the art to which the present disclosure pertains. Terms defined in commonly used dictionaries should not be construed in an idealized or overly formal sense unless expressly so defined herein. Terms used in the following embodiments are for describing the embodiments and are not intended to limit the present disclosure. In the following embodiments, a singular expression includes a plural expression unless the context clearly indicates otherwise.

Also, in describing components of the present disclosure, terms such as first, second, A, B, (a), and (b) may be used. Such terms are only used for distinguishing one component from another component, and the essence, order, sequence, or the like of the corresponding component is not limited by the terms. In a case in which a certain component is described as being "connected," "coupled," or "linked" to another component, it should be understood that, although the component may be directly connected or linked to the other component, still another component may also be "connected," "coupled," or "linked" between the two components.

The terms "comprises" and/or "comprising" used herein do not preclude the possibility of presence or addition of one or more components, steps, operations, and/or devices other than those mentioned.

Prior to describing various embodiments of the present disclosure, some terms used in the embodiments will be clarified.

In the following embodiments, "aerosol-forming substrate" may refer to a material that is able to form an aerosol. The aerosol may include a volatile compound. The aerosol-forming substrate may be a solid or liquid. For example, solid aerosol-forming substrates may include solid materials based on tobacco raw materials such as reconstituted tobacco leaves, shredded tobacco, and reconstituted tobacco, and liquid aerosol-forming substrates may include liquid compositions based on nicotine, tobacco extracts, moisturizers, and/or various flavoring agents. However, the scope of the present disclosure is not limited to the above-listed examples. In the following embodiments, "liquid" may refer to a liquid aerosol-forming substrate.

In the following embodiments, "aerosol-generating article" may refer to an article that is able to generate an aerosol. The aerosol-generating article may include an aerosol-forming substrate. A typical example of the aerosol-generating article may include a cigarette, but the scope of the present disclosure is not limited thereto.

In the following embodiments, "aerosol generation device" may refer to a device that generates an aerosol using an aerosol-forming substrate in order to generate an aerosol that can be inhaled directly into a user's lungs through the user's mouth.

In the following embodiments, "puff" refers to inhalation by a user, and the inhalation may be a situation in which a user draws smoke into his or her oral cavity, nasal cavity, or lungs through the mouth or nose.

In the following embodiments, "upstream" or "upstream direction" may refer to a direction moving away from an oral region of a user, and "downstream" or "downstream direction" may refer to a direction approaching the oral region of the user. The terms "upstream" and "downstream" may be used to describe relative positions of components constituting an aerosol-generating article. For example, in an aerosol-generating article 2 illustrated in FIG. 2, a filter part 21 is disposed downstream from or in a downstream direction of an aerosol-forming substrate part 22, and the aerosol-forming substrate part 22 is disposed upstream from or in an upstream direction of the filter part 21.

In the following embodiments, "longitudinal direction" may refer to a direction corresponding to a longitudinal axis of an aerosol-generating article.

Hereinafter, various embodiments of the present disclosure will be described in detail with reference to the accompanying drawings.

FIG. 1 is an exemplary view schematically illustrating an aerosol generation device 1 according to some embodiments of the present disclosure.

As illustrated in FIG. 1, the aerosol generation device 1 may include a housing 11, a heater part, a vibration part 13, a controller 14, and a battery 15. However, only the components relating to the embodiment of the present disclosure are illustrated in FIG. 1. Therefore, those of ordinary skill in the art to which the present disclosure pertains should understand that the aerosol generation device 1 may further include general-purpose components other than the components illustrated in FIG. 1. For example, the aerosol generation device 1 may further include an output module (e.g., a motor, a display) configured to output a state of the device and/or an input module (e.g., a button) for receiving a user input (e.g., on/off of the device). Hereinafter, each component of the aerosol generation device 1 will be described.

The housing 11 may form an exterior of the aerosol generation device 1. Also, the housing 11 may form an accommodation space in which the aerosol-generating article 2 is accommodated. The aerosol-generating article 2 accommodated in the accommodation space may generate an aerosol when heated by a heating element 12 of the heater part, and the generated aerosol may be inhaled by a user through an oral region of the user. The housing 11 may be made of a suitable material that can protect components therein.

Figure 2:
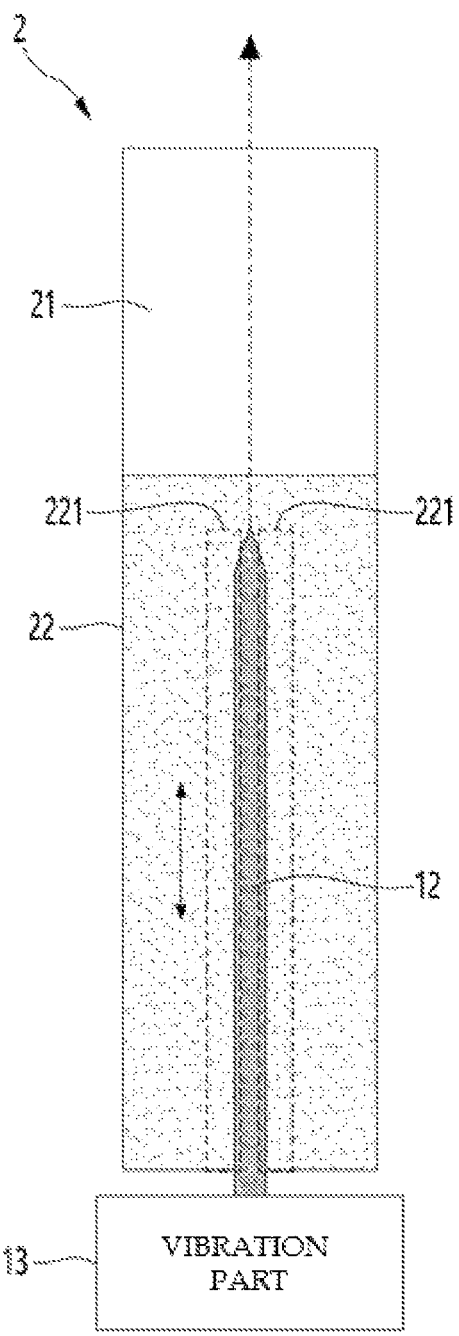

For example, the aerosol-generating article 2 may have a structure similar to a structure of a general combustion-type cigarette. As a specific example, as illustrated in FIG. 2, the aerosol-generating article 2 may be divided into the aerosol-forming substrate part 22 which includes an aerosol-forming substrate and the filter part 21 which includes a filter material. At least a portion of the aerosol-forming substrate part 22 may be accommodated (inserted) in the aerosol generation device 1, and the filter part 21 may be exposed to the outside, but the present disclosure is not limited thereto. A user may smoke while holding the filter part 21 in his or her mouth.

Next, the heater part may heat the aerosol-generating article 2 accommodated in the accommodation space in order to generate an aerosol. Specifically, the heater part may include the heating element 12 inserted into the aerosol-generating article 2, and the heating element 12 may heat the aerosol-forming substrate of the aerosol-generating article 2 from inside using power supplied from the battery 15 in order to generate an aerosol. The operation of the heater part may be controlled by the controller 14.

The shape of the heating element 12 may vary. For example, as illustrated, the heating element 12 may have a shape that can easily be inserted into the aerosol-generating article 2, such as a rod shape or a blade shape. However, the shape of the heating element 12 is not limited thereto, and the heating element 12 may also have a cylindrical or semi-cylindrical shape. The heating element 12 having a cylindrical shape may evenly heat the central portion and outer periphery portion of the aerosol-generating article 2 from inside the aerosol-generating article 2, thus further improving the smoking quality. However, the cylindrical shape has a problem that ease of insertion of the heating element 12 into the aerosol-generating article 2 is somewhat reduced, and such a problem can be addressed by vibrating (e.g., vertically vibrating) the heating element 12 while the heating element 12 is being inserted.

Also, an operation method and/or an implementation form of the heater part may also vary.

For example, the heater part may operate using a resistive heating method. For example, the heater part may include an electrically insulating substrate (e.g., a substrate formed of polyimide) and an electrically conductive track, and an electrically resistive heating element 12 configured to generate heat as current flows may be included in the electrically conductive track.

As another example, the heater part may operate using an induction heating method. For example, the heater part may include an inductor and a heating element 12 (that is, a susceptor) inductively heated by the inductor. An example of the inductor may include an induction coil, but the scope of the present disclosure is not limited thereto. For example, the induction coil may be disposed in a form that surrounds at least a portion of the aerosol-generating article 2 accommodated in the accommodation space.

However, the scope of the present disclosure is not limited to the above examples, and the heater part may operate using any other method as long as the heater part can heat the aerosol-generating article 2 to a desired temperature. Here, the desired temperature may be preset in the aerosol generation device 1 (e.g., a temperature profile may be pre-stored therein) or may be set by the user.

Next, the vibration part 13 may vibrate the heating element 12. For example, the vibration part 13 may be configured to be mechanically (physically) interlocked with the heating element 12 (e.g., the vibration part 13 may be disposed to come in close contact with the heating element 12), and vibration generated in the vibration part 13 may be delivered to the heating element 12. As the heating element 12 is vibrated due to the vibration part 13, formation of stuck-on residue on the heating element 12 during smoking can be prevented, and the stuck-on residue formed on the heating element 12 can be removed. Further, a local carbonization phenomenon of the aerosol-forming substrate can be mitigated, thus improving the smoking quality, and ease of insertion/removal of the heating element 12 into/from the aerosol-generating article 2 can also be improved.

The operation of the vibration part 13 may be controlled by the controller 14. This will be described in detail below with reference to FIG. 4 and so on.

Meanwhile, a direction in which the vibration part 13 vibrates, a structure in which the vibration part 13 is interlocked with the heating element 12, an implementation method of the vibration part 13, a control method of the vibration part 13, or the like may be designed in various ways and may vary according to embodiments.

In some embodiments, as illustrated in FIG. 2, the vibration part 13 may vibrate the heating element 12 in a vertical direction of the aerosol-generating article 2 (that is, a longitudinal direction thereof; refer to the dotted arrow). In that way, ease of insertion/removal of the heating element 12 into/from the aerosol-generating article 2 can be improved, and an aerosol-forming substrate of an area 221 adjacent to the heating element 12 can be effectively prevented from being fixed onto the heating element 12. Also, the stuck-on residue that is already formed on the heating element 12 can be easily removed from the heating element 12 by vibration. However, in some other embodiments, the vibration part 13 may vibrate the heating element 12 in a horizontal direction of the aerosol-generating article 2 or vibrate the heating element 12 in a twist form (e.g., a form in which twist vibration is applied to the heating element 12). In this case, a fine gap may be easily formed between the heating element 12 and the aerosol-forming substrate of the area 221 adjacent to the heating element 12, and thus the local carbonization phenomenon can be prevented more effectively.

Figure 3:
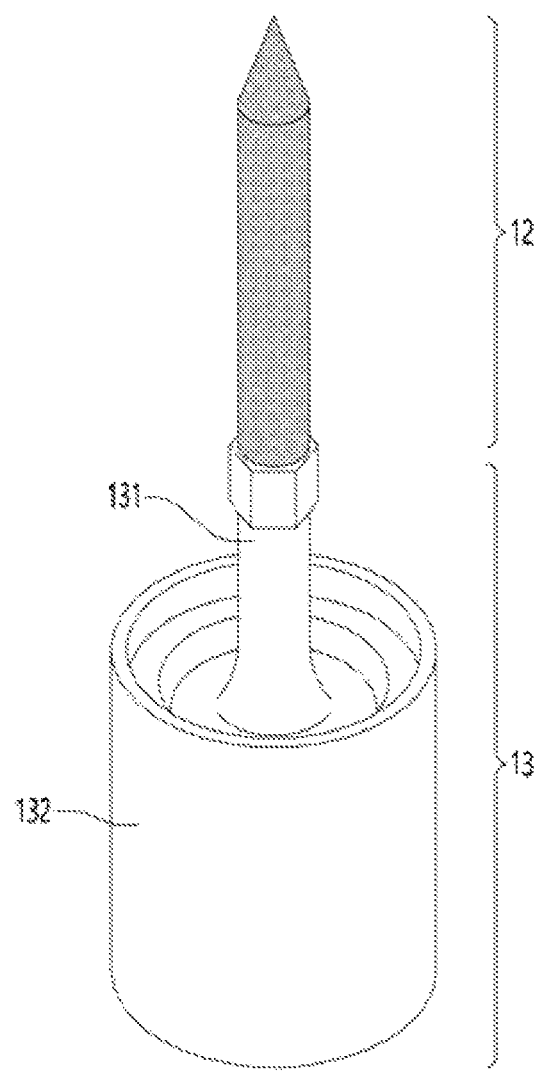

Also, in some embodiments, as illustrated in FIG. 3, the vibration part 13 may consist of a vibration main body 132 and a holder 131, and the heating element 12 may be mounted on (coupled to) the holder 131. Also, the vibration main body 132 may serve to generate vibration, and the holder 131 may serve to fix (i.e., support) the heating element 12 while delivering the generated vibration to the heating element 12. In this case, as the generated vibration is delivered without loss to the heating element 12, the functions of the vibration part 13 (e.g., prevention of formation of stuck-on residue, removal of stuck-on residue, etc.) may be further enhanced. For example, the holder 131 may have an elongated shape (e.g., a horn shape) that protrudes from the vibration main body 132, but the shape of the holder 131 is not limited thereto.

Also, in some embodiments, the vibration part 13 may be implemented on the basis of a piezoelectric element (e.g., an ultrasonic vibrator) that converts an electrical signal into physical vibration using a piezoelectric effect. However, the vibration part 13 is not limited thereto and may be implemented in any other way. Also, an electrical signal applied to the vibration part 13 may have a frequency in a range of about 20 KHz to 40 KHz, but the electrical signal is not limited thereto.

Also, in some embodiments, the vibration part 13 may have a vibration direction changing function. For example, the vibration part 13 may be configured to include a first sub-vibration part that generates vibration in a vertical direction and a second sub-vibration part that generates vibration in a horizontal direction, and may be configured to operate at least one sub-vibration part as necessary. Also, the vibration part 13 may vibrate the heating element 12 in another vibration direction in some cases. For instance, while the heating element 12 is being inserted into the aerosol-generating article 2 or being removed therefrom, the vibration part 13 may vibrate the heating element 12 in the vertical direction to ensure the ease of insertion/removal of the heating element 12 and allow removal of stuck-on residue formed on the heating element 12. Also, during smoking, the vibration part 13 may intermittently vibrate the heating element 12 in the horizontal direction to allow a fine gap to be easily formed between the heating element 12 and the aerosol-forming substrate adjacent thereto. In that way, the local carbonization phenomenon and the formation of stuck-on residue can be effectively prevented.

Next, the controller 14 may control the overall operation of the aerosol generation device 1. For example, the controller 14 may control the operation of the vibration part 13, the heater part, and the battery 15 and may also control the operation of other components included in the aerosol generation device 1. The controller 14 may control the operation of the vibration part 13 (e.g., the on/off of vibration, a vibration speed, a vibration intensity, a vibration direction, etc.), the power supplied by the battery 15, the heating operation of the heater part, and the like. Also, the controller 14 may check a state of each of the components of the aerosol generation device 1 and determine whether the aerosol generation device 1 is in an operable state.

The operation of the controller 14 will be described in more detail below with reference to FIG. 4.

The controller 14 may be implemented with at least one processor. The processor may also be implemented with an array of a plurality of logic gates or implemented with a combination of a general-purpose microprocessor and a memory which stores a program that may be executed by the microprocessor. Also, those of ordinary skill in the art to which the present disclosure pertains should clearly understand that the controller 14 may also be implemented with other forms of hardware.

Next, the battery 15 may supply power used to operate the aerosol generation device 1. For example, the battery 15 may supply power to the vibration part 13 and the heater part and may supply power required for the operation of the controller 14.

Also, the battery 15 may supply power necessary to operate electric components such as a display (not illustrated), a sensor (not illustrated), and a motor (not illustrated) that are installed in the aerosol generation device 1.

The aerosol generation device 1 according to some embodiments of the present disclosure has been described above with reference to FIGS. 1 to 3. According to the above description, the aerosol generation device 1 having the vibration part 13 may be provided. The aerosol generation device 1 may vibrate the heating element 12 using the vibration part 13 to prevent formation of stuck-on residue on the heating element 12 and allow removal of stuck-on residue formed on the heating element 12. Accordingly, the cleanliness of the aerosol generation device 1 can be improved, and a problem that stuck-on residue causes a burnt taste can also be significantly mitigated.

Hereinafter, a control method of an aerosol generation device (e.g., 1) will be described in detail with reference to FIG. 4 and so on.

Each step of the control method which will be described below may be performed by a controller (e.g., 14; or a processor) of the aerosol generation device (e.g., 1). Also, each step of the control method may be implemented using one or more instructions executed by the controller (e.g., 14) of the aerosol generation device (e.g., 1). Hereinafter, description will be continued assuming that each step of the control method is performed by the controller 14 of the aerosol generation device 1 illustrated in FIG. 1. Therefore, in the following description, when the subject of a specific operation is omitted, the specific operation may be understood as being performed by the controller 14.

Figure 4:
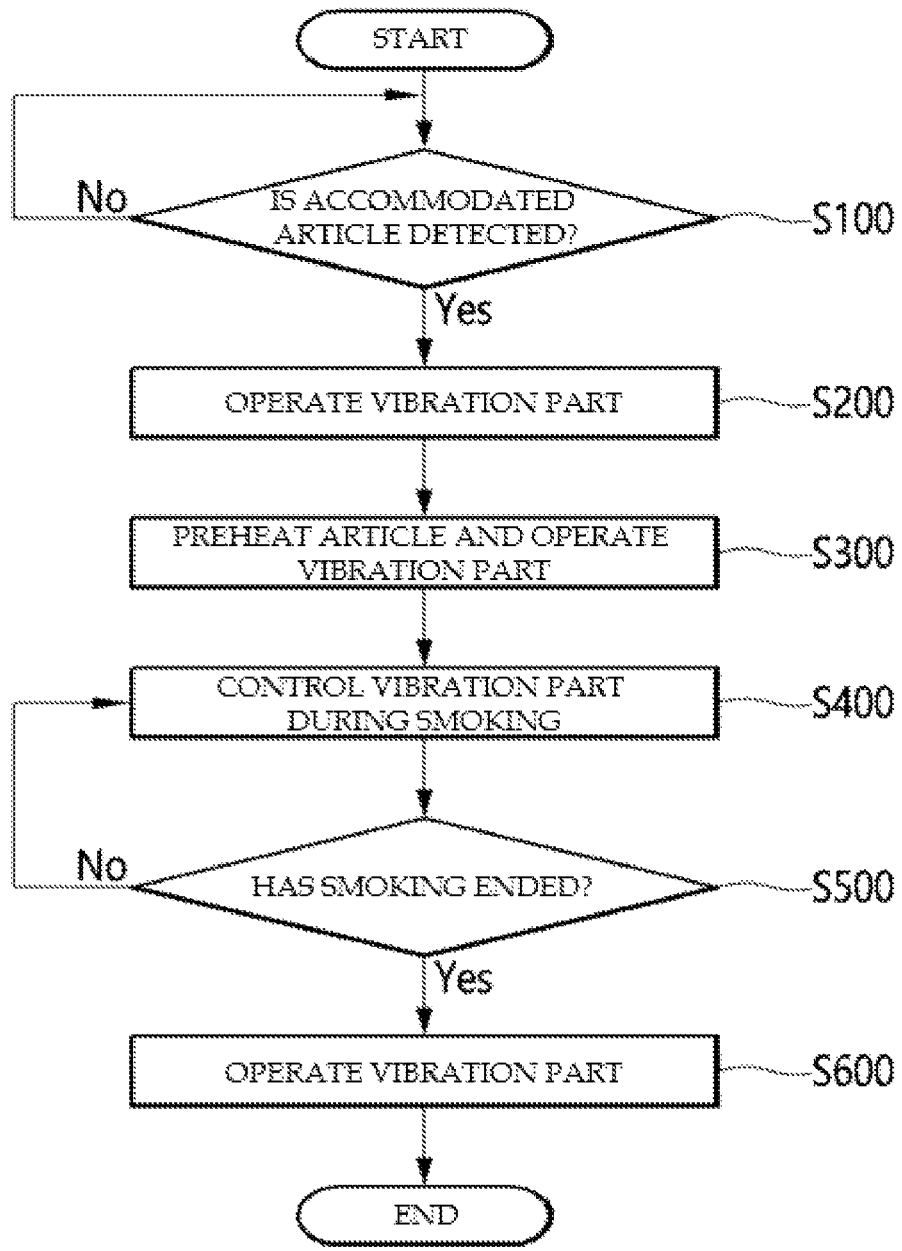

FIG. 4 is an exemplary flowchart schematically illustrating a control method of an aerosol generation device according to some embodiments of the present disclosure. However, this is only an exemplary embodiment for achieving the objectives of the present disclosure, and of course, some steps may be added or omitted as necessary.

As illustrated in FIG. 4, the control method according to the present embodiment may begin by step S100 in which the controller 14 determines whether the aerosol-generating article 2 is accommodated in the accommodation space. Whether the aerosol-generating article 2 is accommodated may be determined by the controller 14 using any method.

In step S200, the controller 14 may operate the vibration part 13 in response to determination that the aerosol-generating article 2 is accommodated. That is, the controller 14 may operate the vibration part 13 while the heating element 12 is being inserted into the aerosol-generating article 2. In this case, since the heating element 12 is inserted into the aerosol-generating article 2 while being vibrated (e.g., vibrated in the vertical direction), the heating element 12 can be easily inserted into the aerosol-generating article 2. For example, even when the heating element 12 has a cylindrical shape instead of a rod shape or a blade shape, by help of vibration, the heating element 12 can be easily inserted into the aerosol-generating article 2.

In step S300, the controller 14 may preheat the accommodated aerosol-generating article 2 using the heating element 12. Also, the controller 14 may operate the vibration part 13 while the aerosol-generating article 2 is being preheated. In this case, formation of stuck-on residue on the vibration part 13 or an occurrence of the local carbonization phenomenon due to a sharp temperature rise of the heating element 12 that occurs while the heating element 12 preheats the aerosol-generating article 2 can be prevented.

In step S400, the controller 14 may control the vibration part 13 during smoking. That is, after the preheating ends, the controller 14 may appropriately control the vibration part 13 from the start of smoking until the end of smoking. However, a specific control method may vary according to embodiments.

In some embodiments, the controller 14 may control the vibration part 13 according to a predetermined time condition. In other words, the controller 14 may operate the vibration part 13 during a designated amount of time at a designated time point. For example, the controller 14 may periodically operate the vibration part 13 during smoking. As another example, the controller 14 may operate the vibration part 13 at a designated smoking time point (e.g., 3 seconds after the start of smoking, 7 seconds after the start of smoking, 12 seconds after the start of smoking, 3 seconds before the end of smoking, upon the end of smoking, 1 second after the end of smoking, etc.) in an aperiodic manner.

Also, in some embodiments, the controller 14 may control the vibration part 13 according to a predetermined temperature condition. The present embodiment will be described in detail below with reference to FIG. 5.

Also, in some embodiments, the controller 14 may control the vibration part 13 according to a predetermined puff condition. The present embodiment will be described in detail below with reference to FIG. 6.

In step S500, the controller 14 may determine whether smoking has ended. For example, the controller 14 may determine an end of smoking on the basis of a puff number (e.g., determine that smoking has ended when 8 puffs have been made), elapsed time after the start of smoking (e.g., determine that smoking has ended when 30 seconds have elapsed after the start of smoking), whether a puff has not been detected for a predetermined amount of time or more (e.g., determine that smoking has ended when a puff has not been detected for 2 seconds or more), a user input indicating an end of smoking, or a combination thereof. However, the scope of the present disclosure is not limited thereto, and whether smoking has ended may be determined in any other way.

In step S600, the controller 14 may operate the vibration part 13 in response to determination that smoking has ended. In other words, the controller 14 may operate the vibration part 13 at a time point at which smoking ends. In this case, since stuck-on residue formed on a surface of the heating element 12 during smoking may be removed, the cleanliness of the aerosol generation device 1 can be improved. Further, a problem that stuck-on residue formed on the heating element 12 causes a burnt taste to be expressed during subsequent smoking can also be addressed.

In some embodiments, the controller 14 may operate the vibration part 13 while the aerosol-generating article 2 is being removed. In this case, the aerosol-generating article 2 can be easily removed from the aerosol generation device 1 (that is, the heating element 12 can be easily removed from the aerosol-generating article 2), and the stuck-on residue removal effect can be further enhanced.

Meanwhile, in some embodiments, the controller 14 may control a vibration speed, a vibration duration, and/or a vibration intensity of the vibration part 13 on the basis of a predetermined condition. For example, the controller 14 may vibrate the heating element 12 with a relatively high intensity during smoking and may vibrate the heating element 12 with a relatively low intensity at a time point at which the aerosol-generating article 2 is being accommodated/removed. In this case, a phenomenon in which the aerosol-generating article 2 shakes due to vibration when the aerosol-generating article 2 is being accommodated/removed can be effectively prevented, and formation of stuck-on residue on the aerosol-generating article 2 can also be effectively prevented. As another example, the controller 14 may vibrate the heating element 12 with a higher intensity after smoking ends as compared to during smoking. In this case, stuck-on residue formed on the heating element 12 during smoking can be effectively removed.

The control method of the aerosol generation device according to some embodiments of the present disclosure has been described above with reference to FIG. 4. According to the above-described method, by operating the vibration part 13 on the basis of an appropriate condition, ease of insertion and removal of the heating element 12 into and from the aerosol-generating article 2 can be improved, and formation of stuck-on residue on the heating element 12 can also be effectively prevented.

Hereinafter, some examples relating to a method of controlling the operation of the vibration part 13 during smoking will be described with reference to FIGS. 5 and 6.

Figure 5:
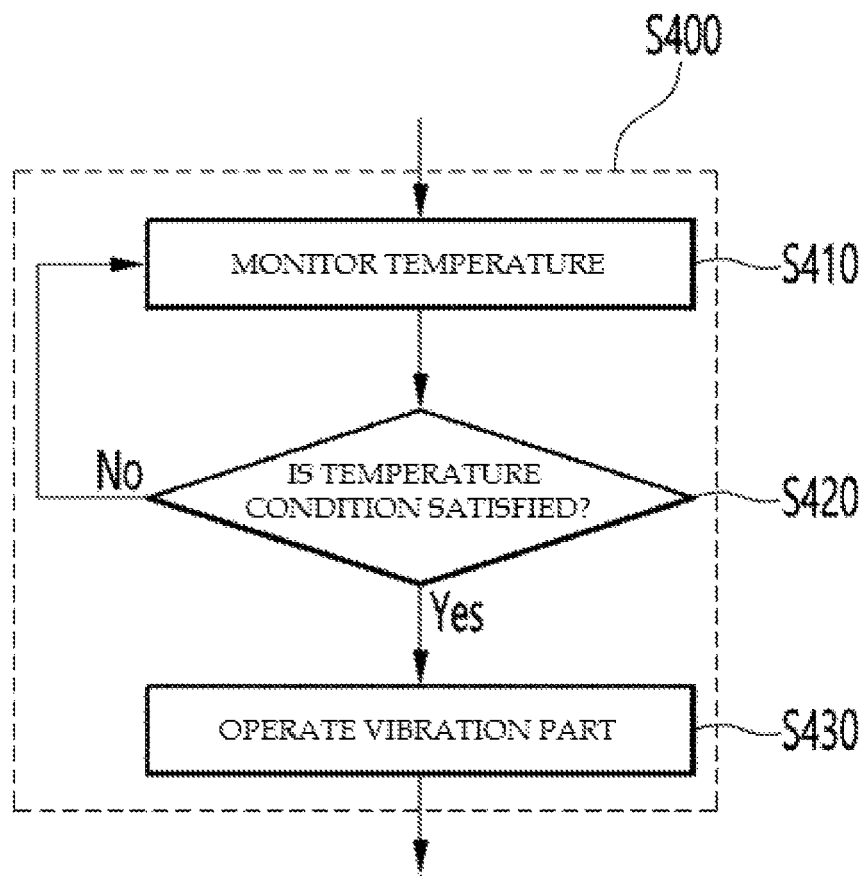

FIG. 5 is an exemplary flowchart illustrating a method of controlling a vibration part according to some embodiments of the present disclosure.

As illustrated in FIG. 5, the present embodiment relates to a method of controlling the vibration part 13 on the basis of a temperature condition of the heating element 12.

Specifically, the method according to the present embodiment may begin by step S410 in which the controller 14 monitors a temperature of the heating element 12. For example, the controller 14 may monitor the temperature of the heating element 12 using a temperature sensor. However, the scope of the present disclosure is not limited thereto, and the temperature of the heating element 12 may be monitored in any other way.

In step S420, the controller 14 may determine whether the monitored temperature is a reference value or higher. Here, the reference value may be a preset fixed value or variable value that changes according to situations.

In step S430, the controller 14 may operate the vibration part 13 in response to determination that the monitored temperature is the reference value or higher. Alternatively, the controller 14 may operate the vibration part 13 in response to determination that a speed (slope) of an increase of the monitored temperature is the reference value or higher. This is because the higher the temperature of heat generated by the heating element 12, the more likely that the aerosol-forming substrate, which is adjacent to the heating element 12, is condensed by the heat, thereby forming stuck-on residue.

In some embodiments, the controller 14 may control the vibration speed, vibration duration, and/or vibration intensity of the vibration part 13 on the basis of a temperature condition. For example, the controller 14 may increase the vibration speed, vibration duration, and/or vibration intensity of the vibration part 13 as the monitored temperature increases (or the speed of an increase of the temperature increases). This is because the higher the temperature of the heating element 12, the higher the probability of formation of stuck-on residue and the higher the fixing strength of the formed stuck-on residue. Conversely, the controller 14 may decrease the vibration speed, vibration duration, and/or vibration intensity of the vibration part 13 as the monitored temperature decreases (or the speed of a decrease of the temperature increases).

The method of controlling the vibration part according to some embodiments of the present disclosure has been described above with reference to FIG. 5. According to the above-described method, the vibration part 13 may be operated at an appropriate time point based on a temperature condition. Accordingly, operational efficiency of the vibration part 13 can be improved. For example, by operating the vibration part 13 at a time point at which the probability of formation of stuck-on residue is high on the basis of a temperature condition, power consumption of the vibration part 13 can be reduced, and formation of stuck-on residue can also be effectively prevented.

Hereinafter, a method of controlling a vibration part according to some other embodiments of the present disclosure will be described with reference to FIG. 6.

Figure 6:
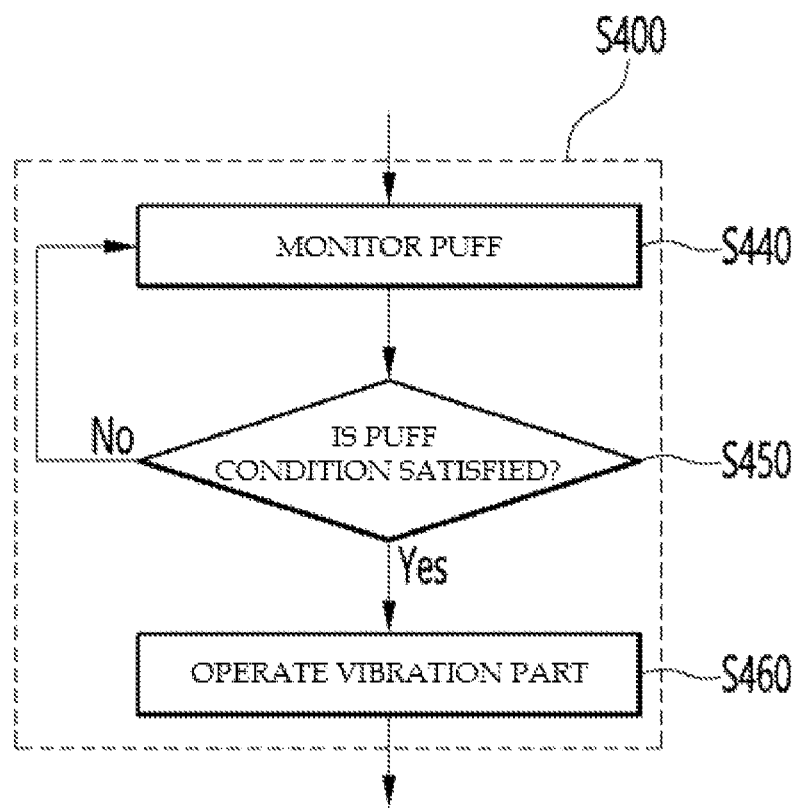

FIG. 6 is an exemplary flowchart illustrating a method of controlling a vibration part according to some other embodiments of the present disclosure.

As illustrated in FIG. 6, the present embodiment relates to a method of controlling the vibration part 13 on the basis of a user's puff condition.

Specifically, the method according to the present embodiment may begin by step S440 in which the controller 14 monitors a user's puff (e.g., whether a puff is made, a puff intensity, etc.). For example, the controller 14 may monitor the user's puff using an airflow sensor. However, the scope of the present disclosure is not limited thereto, and a user's puff may be monitored in any other way.

In step S450, the controller 14 may determine whether a user's puff is detected during monitoring.

In step S460, the controller 14 may operate the vibration part 13 in response to determination that a puff is detected. For example, the controller 14 may operate the vibration part 13 from a time point at which a puff is detected until the puff ends (that is, by as much as a length of the puff). This is because, upon a puff, heating of the aerosol-generating article 2 is accelerated due to an airflow entering the aerosol-generating article 2, and thus the probability of formation of stuck-on residue on the heating element 12 increases.

In some embodiments, the controller 14 may also control the vibration speed, vibration duration, and/or vibration intensity of the vibration part 13 on the basis of a puff condition. For example, the controller 14 may control the vibration speed, vibration duration, and/or vibration intensity of the vibration part 13 on the basis of a puff intensity (e.g., increase the vibration speed, vibration duration, and/or vibration intensity of the vibration part 13 with an increase in the puff intensity). As another example, the controller 14 may control the vibration speed, vibration duration, and/or vibration intensity on the basis of a puff length or a puff interval (e.g., increase the vibration speed, vibration duration, and/or vibration intensity with an increase in the puff length or a decrease in the puff interval).

The method of controlling the vibration part according to some other embodiments of the present disclosure has been described above with reference to FIG. 6. According to the above-described method, the vibration part 13 may be operated at an appropriate time point based on a puff condition. Accordingly, operational efficiency of the vibration part 13 can be improved. For example, by operating the vibration part 13 at a time point at which the probability of formation of stuck-on residue is high on the basis of a puff condition, power consumption of the vibration part 13 can be reduced, and formation of stuck-on residue can also be effectively prevented.

The technical spirit of the present disclosure described above with reference to FIGS. 1 to 6 may be implemented with computer-readable code on computer-readable recording media. Examples of the computer-readable recording media may include removable recording media (a compact disc (CD), a digital versatile disc (DVD), a Blu-Ray disk, a Universal Serial Bus (USB) storage device, or a removable hard disk) or non-removable recording media (a read-only memory (ROM), a random access memory (RAM), or a built-in hard disk). Computer programs recorded in the computer-readable recording media may be sent to other computing devices through a network, such as the Internet, and installed on the other computing devices to be used in the other computing devices.

All the components constituting the embodiments of the present disclosure have been described above as being combined into one body or being operated in combination, but the technical spirit of the present disclosure is not necessarily limited to the embodiments. That is, any one or more of the components may be selectively operated in combination within the intended scope of the present disclosure.

The embodiments of the present disclosure have been described above with reference to the accompanying drawings, but those of ordinary skill in the art to which the present disclosure pertains should understand that the present disclosure may be embodied in other specific forms without changing the technical spirit or essential features thereof Therefore, the embodiments described above should be understood as being illustrative, instead of limiting, in all aspects. The scope of the present disclosure should be interpreted according to the claims below, and any technical spirit within the scope equivalent to the claims should be interpreted as falling within the scope of the technical spirit defined by the present disclosure.

What is claimed is:

1. An aerosol generation device comprising:
   a housing including an accommodation space for accommodating an aerosol-generating article;
   a heating element configured to be inserted into the aerosol-generating article accommodated in the accommodation space and heat the accommodated aerosol-generating article to generate an aerosol;
   a vibration part configured to vibrate the heating element in a vertical direction of the accommodated aerosol-generating article; and
   a controller configured to control the vibration part,
   wherein the controller is configured to operate the vibration part to vibrate in the vertical direction while the heating element is being inserted into the aerosol-generating article.

2. The aerosol generation device of claim 1, wherein the vibration part vibrates the heating element in a horizontal direction of the accommodated aerosol-generating article or vibrates the heating element in a twist form.

3. The aerosol generation device of claim 1, wherein the controller operates the vibration part at a time point at which smoking ends or while the accommodated aerosol-generating article is being removed.

4. The aerosol generation device of claim 1, wherein the controller operates the vibration part at a time point at which preheating occurs.

5. The aerosol generation device of claim 1, wherein the controller controls an operation of the vibration part based on a predetermined time condition.

6. The aerosol generation device of claim 1, wherein the controller operates the vibration part in response to a determination that a temperature of the heating element is a reference value or higher.

7. The aerosol generation device of claim 1, wherein the controller controls a vibration intensity, a vibration duration, or a vibration speed of the vibration part based on a temperature condition of the heating element.

8. The aerosol generation device of claim 1, wherein the controller operates the vibration part in response to detection of a user's puff.

9. The aerosol generation device of claim 1, wherein the controller controls a vibration intensity, a vibration duration, or a vibration speed of the vibration part based on a user's puff condition.

10. The aerosol generation device of claim 1, wherein the vibration part includes an ultrasonic vibrator that converts an electric signal into the vibration that vibrates the heating element, and
    wherein the electric signal applied to the vibration part is in a range from 20 KHz to 40 KHz.

* * * * *